United States Patent

Horn et al.

[11] 4,075,939
[45] Feb. 28, 1978

[54] LIQUID FEEDING DEVICE FOR COOKING CONTAINERS

[75] Inventors: Walter Horn, Idar-Oberstein; Rudolf Fissler, Kirschweiler, both of Germany

[73] Assignee: Fissler Gesellschaft mit beschrankter Haftung, Idar-Oberstein, Germany

[21] Appl. No.: 455,878

[22] Filed: Mar. 28, 1974

[30] Foreign Application Priority Data

Mar. 31, 1973 Germany ................. 7312332[U]

[51] Int. Cl.² .................................................. A47J 27/52
[52] U.S. Cl. .................................................. 99/345; 222/510
[58] Field of Search ................. 99/345, 295, 346–347, 99/440; 126/377, 384; 222/510, 469, 496

[56] References Cited

U.S. PATENT DOCUMENTS

| 571,474 | 11/1896 | Grandjean | 210/496 X |
| 1,193,333 | 8/1916 | Acheson | 210/496 |
| 1,313,947 | 8/1919 | Lafferty | 99/440 |
| 1,432,407 | 10/1922 | Mieville | 99/345 |
| 2,224,577 | 12/1940 | Shively et al. | 99/295 UX |
| 3,022,721 | 2/1962 | Vath | 99/345 |
| 3,596,590 | 8/1971 | Harris | 99/345 |
| 3,762,307 | 10/1973 | Badovinac | 99/345 X |

FOREIGN PATENT DOCUMENTS 3,705 of 1902 United Kingdom ............... 99/345

Primary Examiner—Harvey C. Hornsby
Assistant Examiner—Arthur O. Henderson
Attorney, Agent, or Firm—Friedman, Goodman & Teitelbaum

[57] ABSTRACT

A liquid feeding device for roasting or stewing pots is described which permits a supply of liquid, and specifically water, to be continuously added to the interior of the pot to compensate for liquids lost by evaporation. The liquid feeding device is in the form of a liquid reservoir mounted on the cover of the pot, the reservoir having a porous, liquid permeable bottom wall through which the liquid is stored in the reservoir may slowly be filtered. The reservoir, which may be made entirely from a porous surrounding-type material, is advantageously provided with impermeable coatings on the side walls thereof to limit the flow of water into the cooking container through the bottom wall thereof. Advantageously, an array of nipples are provided on the under surface of the reservoir to assure a uniform distribution of liquid flow. Advantageously, the liquid reservoir has a top cover thereof which can be removed for refilling the reservoir as needed and is provided with connecting means for removably connecting the reservoir to the top cover of the pot, whereby reservoirs exhibiting different porosity characteristics may be interchanged to alter or modify the flow of liquid into the cooking container. The rate of flow of liquid from the reservoir to the cooking container may also be regulated by providing means which permits adjustment of the rate of flow of air into the interior of the reservoir.

5 Claims, 1 Drawing Figure

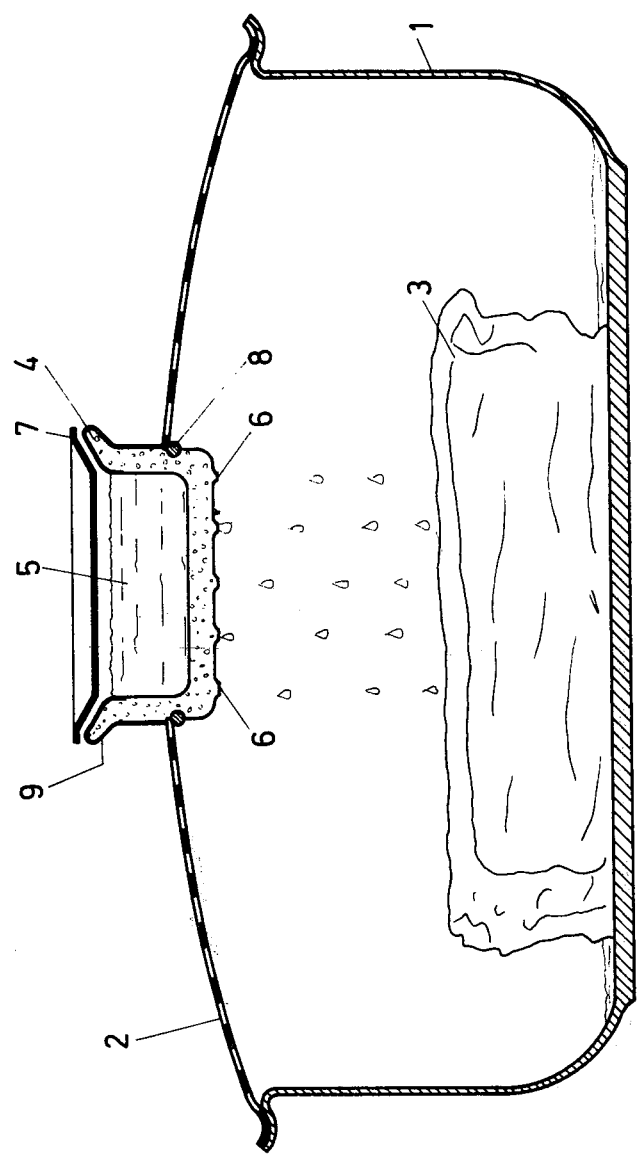

LIQUID FEEDING DEVICE FOR COOKING CONTAINERS

BACKGROUND OF THE INVENTION

The present invention generally relates to cooking containers and the like, and more specifically to a liquid feeding device for a cooking container in the form of a roasting or stewing pot.

Generally, in preparing a roast or cooking meat in roasting or stewing pots, a liquid, and specifically water, must be periodically added to compensate for the evaporation of natural liquids of the food being cooked. Liquid must also be added to the food being cooked to assure that roasting sauce or gravy is formed since a sufficient amount of the latter may be prevented from being formed due to the above described evaporation of liquids.

As well known, the addition of liquid for the above purposes, requires that the cover of the cooking container be lifted from time to time during the cooking process and the required volume of liquid added. This step is inconvenient and time consuming, particularly when the cooking time is extended. The inconvenience is particularly acute where the cooking container is placed within a closed broiler since the addition of water in these cases includes opening the broiler, pulling the hot pot out of the broiler and removing the equally hot cover of the pot prior to adding the liquid.

The addition of water periodically as above described presents a further problem in that the opening of the broiler and pot results in a corresponding drop in temperature within the broiler and within the pot. This extends the cooking time and represents a loss of energy. Furthermore, each opening of the pot releases vapors and drippings which in time stain both the broiler and surroundings.

The present invention eliminates the above described disadvantages and simplifies and automates the water feeding process.

SUMMARY OF THE INVENTION

Accordingly, it is an object of the present invention to provide a liquid feeding device for a cooking container which eliminates the above described disadvantages inherent in the use of prior art roasting and stewing pots and the like.

It is still another object of the present invention to provide a liquid device as above described which is simple in construction and economical to manufacture.

It is still another object of the present invention to provide a liquid feeding device of the type under discussion which continuously supplies fluid to replace evaporated fluids within a cooking container without repeatedly opening the broiler and pot.

It is yet another object of the present invention to provide a liquid feeding device of the type described in the above objects which continuously and uniformly supplies water to the interior of a cooking pot.

It is yet another object of the present invention to provide a liquid feeding device for cooking containers which includes means for regulating the rate at which the fluid is transmitted to the interior of the cooking container.

In order to achieve the above objects, as well as others which will become apparent hereafter, a liquid feeding device, for a cooking container having an upper wall, comprises a liquid reservoir supported by the upper wall and having at least a portion thereof disposed within the cooking container. Said reservoir portion is at least partially porous and liquid permeable. In this manner, liquid placed within said reservoir is permitted to be gradually transferred to the interior of the cooking container to replace the evaporated liquids during cooking. In accordance with the presently preferred embodiment, said reservoir is made of a ceramic-type material and only the bottom wall thereof is porous and liquid permeable. Where the entire reservoir is made of a porous, liquid permeable material, a ceramic glaze is provided on the side walls thereof to permit only liquid to flow through the bottom wall thereof. Said bottom wall of said reservoir has a lower surface which faces the interior of the cooking container. Advantageously, a plurality of nipples are provided and arranged on said lower surface in a uniform array for equally distributing the liquid flow through said lower surface.

Said reservoir may either be incorporated within a knob of a removable cover of the cooking container or the reservoir may be configurated in the form of a knob suitable for gripping the cover.

Advantageously, said reservoir is interchangeable to permit selection of the porosity of the reservoir and thereby select the rate of flow of liquid from the reservoir into the container. The rate of flow of liquid from the reservoir into the container may also be adjusted by providing suitable means for regulating the supply of air to the interior of the reservoir.

BRIEF DESCRIPTION OF THE DRAWING

With the above and additional objects and advantages in view, as will hereinafter appear, this invention comprises the devices, combinations and arrangements of parts hereinafter described by way of example and illustrated in the accompanying drawing of a preferred embodiment in which:

The FIGURE is a vertical cross section of a cooking container with a removable cover, showing the reservoir of the present invention mounted on the cover and indicating the manner in which liquid placed within the reservoir is permitted to be filtered through the lower wall of the reservoir into the interior of the cooking container.

DESCRIPTION OF THE PREFERRED EMBODIMENT

Referring now specifically to the FIGURE, a cooking container 1 is shown which incorporates the present invention. The cooking container 1 may be in the form of a roasting or stewing pot. The container 1 includes a removable cover 2 which, when mounted on the container 1, forms a closed space within which meat or food 3 to be roasted or stewed may be placed.

In the center of the cover 2, there is provided an insert or reservoir 4 which includes at least a lower portion thereof which extends through an opening in the cover 2 and is disposed within the cooking container 1. The reservoir 4 is advantageously made of porous, liquid permeable material. For this purpose, the reservoir 4 may be made from a ceramic-type material.

The reservoir 4 itself has a container-like shape suitable to be filled with a quantity of liquid or water 5 through a reservoir cover 7. The reservoir cover 7 is advantageously removable and can clearly be utilized to refill the reservoir 4 with liquid as required.

The reservoir 4 is advantageously removable or separable from the cover 2. This permits the reservoir 4 to be conveniently refilled. Additionally, the reservoir 4 may, in this manner, be interchanged with another reservoir having different filtering characteristics, whereby the rate of supply of liquid to the interior of the container 1 may be selected and regulated. For this reason, connecting means may advantageously be provided, such as a snap ring 8, which cooperate the cover 2 and with the opening therein, for permitting connection of the reservoir 4 and separation thereof from the cover.

To achieve the above described objects, it is necessary that at least a portion of the reservoir 4 be made from a porous, water permeable material. Clearly, this porous portion is disposed within the cooking container to thereby permit a direct flow of liquid from the reservoir into the interior of the container. According to one embodiment of the reservoir 4, the entire structure of the reservoir is formed of the porous material. Where the entire reservoir 4 is made of a porous material, however, a glazed coating 9 is advantageously provided on the side walls of the reservoir to prevent flow of liquid through the side walls. In this manner, liquid 5 may only flow through the bottom wall 10 of the reservoir. Alternately, instead of providing glazed coatings, the reservoir 4 may be formed so that only the bottom wall thereof is made of a porous, water permeable material.

As shown in the FIGURE, the reservoir 4 may project above the cover 2 and be configured in the form of a knob 11 suitable for gripping the cover. Alternately, the reservoir 4 may be incorporated or formed within a conventional knob.

To distribute the flow of liquid through the bottom wall 10, a plurality of nipples 6 are advantageously provided on the lower surface 12 which faces the interior of the cooking container. When the nipples 6 are arranged in a uniform array, the liquid flow is equally distributed through the lower surface 12. Each of the nipples 10 forms a point at which water droplets accumulate and drop. In this manner, liquid may be deposited in a uniform manner over the roast meat or other food 3.

Drip-time or the rate at which liquid is transferred from the reservoir to the interior of the container 1 is selectable through selection of the proper reservoir materials, particularly the materials for the bottom wall 10 thereof. As described above, when the reservoirs 4 are interchangeable, the degree or rate of flow may conveniently be changed or modified by interchanging containers having different porosity.

Prior to starting the cooking process, the reservoir 4 may be filled with water which then filters through the porous material to spread itself over a preset period of time over the roast meat disposed inside the pot 1. By preventing the loss of liquid through the side walls of the reservoir 4, the supply of liquid is efficiently used and the feed time of the reservoir 4 is extended.

To prevent undesired evaporation of liquid from the reservoir 4 and to simplify the refilling process, the cover 7 is advantageously removable, as described above.

Where additional control is to be provided over the rate of flow of fluid from the reservoir to the cooking container 1, the cover 7 is advantageously fitted on the reservoir in an air tight sealed condition. With such an arrangement, suitable means may be provided for controlling the air supply to the interior of the reservoir 4. In this manner, the rate of liquid outflow through the bottom wall 10 is a function of the amount of air which is permitted to flow into the reservoir 4 to replace the outflowing liquid.

While a snap ring 8 has been described as the connecting means for permitting quick interchange of reservoirs, it is clear that the particular nature of the connecting means is not critical for the purpose of the present invention and any other attaching or connecting means may be utilized with different degrees of advantage.

Numerous alterations of the structure herein disclosed will suggest themselves to those skilled in the art. However, it is to be understood that the present disclosure relates to a preferred embodiment which is for purposes of illustration only and is not to be construed as a limitation of the invention.

What is claimed is:

1. A liquid feeding device for a cooking container having an upper wall, said feeding device comprising a liquid reservoir, means supporting said reservoir on the upper wall of the cooking container with at least a portion of said reservoir being disposed within the cooking container so that liquid placed within said reservoir can be transferred to interior of the cooking container for replacing liquids evaporated during cooking, said reservoir portion includes porous, liquid permeable means for permitting the liquid within said reservoir to be gradually fed to the interior of the cooking container, said porous means being a ceramic material, said reservoir having side and bottom walls completely formed of porous, liquid permeable ceramic material, and a liquid impervious coating disposed on the side walls of said reservoir, whereby water is only permitted to be fed through said bottom wall.

2. A liquid feeding device as defined in claim 1, wherein said coating is in the form of a ceramic glaze coating.

3. A liquid feeding device for a cooking container having an upper wall where the upper wall has an opening, said feeding device comprising a liquid reservoir, means supporting said reservoir on the upper wall of the cooking container with at least a portion of said reservoir being disposed within the cooking container so that liquid placed within said reservoir can be transferred to interior of the cooking container for replacing liquids evaporated during cooking, said reservoir portion including porous, liquid permeable means for permitting the liquid within said reservoir to be gradually fed to the interior of the cooking container, said porous means being a ceramic material, said reservoir being removably mounted on the upper wall by at least partial insertion through the opening of the upper wall, connecting means for removably connecting said reservoir to said upper wall, whereby said reservoir may be removed and replaced by another reservoir, said connecting means comprising snap ring means cooperating with said opening.

4. A liquid feeding device for a cooking container having an upper wall, said feeding device comprising a liquid reservoir, means supporting said reservoir on the upper wall of the cooking container with at least a portion of said reservoir being disposed within the cooking container so that liquid placed within said reservoir can be transferred to interior of the cooking container for replacing liquids evaporated during cooking, said reservoir portion including porous, liquid permeable means for permitting the liquid within said reservoir to be gradually fed to the interior of the cooking container, said porous means being a ceramic material, said reservoir having a bottom wall made of porous, liquid permeable ceramic material, said bottom wall having a lower surface facing the interior of the cooking container, and a plurality of nipples disposed on said lower surface for distributing the liquid flow through the latter.

5. A liquid feeding device as defined in claim 4, wherein said nipples are arranged in a uniform array for equally distributing the liquid flow through said lower surface.

* * * * *